UNITED STATES PATENT OFFICE 2,247,790

METHOD OF FORMING CHLOROACRYLATE POLYMERS

Franklin Strain and Maxwell A. Pollack, Akron, Ohio, assignors to Pittsburgh Plate Glass Company, Allegheny County, Pa., a corporation of Pennsylvania No Drawing. Application August 12, 1939,
Serial No. 289,898

13 Claims. (Cl. 260—83)

This invention relates to the polymerization of chloroacrylates and particularly to the esters, thioesters, amides, thioamides, nitriles, chlorides and salts of alpha chloroacrylic acid. In the polymerization of such materials difficulty is encountered in securing colorless products. The problem is particularly acute in the polymerization of various esters such as the alkyl esters of chloroacrylic acid, for example, the methyl, ethyl, propyl, butyl, amyl, n-hexyl, octyl, lauryl, octadecyl, esters, etc. or the alkenyl esters such as allyl, methallyl, 2-chloroallyl, crotyl, oleyl, cyclohexenyl alpha chloroacrylates or the polyhydric alcohol esters of alpha chloroacrylic acid such as the glycol, glycerol, mannitol or sorbitol esters thereof. In addition, difficulty is encountered in preventing color formation during polymerization of aryl, aralkyl or heterocyclic esters such as phenyl, cresyl, resorcinyl, naphthyl, benzyl, phenyl ethyl, fenchyl, or furfuryl alpha chloroacrylates.

In accordance with our invention, we have found that the formation of color during polymerization may be prevented by preventing substantial contact of the product undergoing polymerization with water or moisture. In general, we have found that the moisture normally present in the atmosphere is sufficient to cause formation of color during polymerization, but that a colorless, water-white product may be prepared by polymerizing the substantially anhydrous monomer in a substantially anhydrous atmosphere. The monomeric material should be dehydrated as completely as possible although minute concentrations of water are permissible. Generally the monomer may be dehydrated suitably by distilling and separately collecting the first fraction of about 5 or 10 percent and the more anhydrous fractions of the distillate which distill later in the distillation process. Similarly, the products may be dehydrated with copper sulphate, calcium chloride, dehydrated alumina, dry lime, silica gel, active carbon or similar dehydration agent.

In most cases it is desirable to distil the monomer, removing a portion of the distillate as indicated above since, in this manner it is possible to eliminate both water and water reaction or hydrolysis products which tend to cause color formation. The remaining monomer freed from these products may then be polymerized as such or may be distilled prior to polymerization.

The polymerization may be conducted in a dry atmosphere such as dry air, dry nitrogen, carbon dioxide, etc. These gases may be dried in any convenient method such as by the usual methods of dehydrating air with silica or similar adsorbent or by cooling the air below its dew point.

The following example is illustrative:

A quantity of methyl chloroacrylate was dried over anhydrous alumina and distilled through a 20 inch Vigreux column. The first five percent of the distillate was discarded, and the remainder was collected and stored out of contact with air.

To the pure ester was added 0.1 percent of benzoyl peroxide and the mixture was brought to a viscous state by careful heating at 75° C. The viscous resin was transferred out of contact with air to a mold with glass walls and was subsequently heated at 40° C. for 36 hours and then at 100° C. for 3 hours. The resulting resin plate was easily removed from the glass walls and was clear and water-white in color.

An experiment performed similarly to the above but with undried monomer led to the formation of a plate which was yellow in color.

Although the present invention has been described with particular reference to the specific details of certain embodiments thereof, it is not intended that such details shall be regarded as limitations upon the scope of the invention except insofar as included in the accompanying claims.

We claim:

1. A method of polymerizing an alpha chloroacrylate while minimizing color formation during the polymerization which comprises conducting the polymerization under substantially anhydrous conditions.

2. A method of polymerizing an ester of alpha chloroacrylic acid while minimizing color formation during the polymerization which comprises conducting the polymerization under substantially anhydrous conditions.

3. A method of polymerizing an alkyl alpha chloroacrylate while minimizing color formation during the polymerization which comprises conducting the polymerization under substantially anhydrous conditions.

4. A method of polymerizing methyl alpha chloroacrylate while minimizing color formation during the polymerization which comprises conducting the polymerization under substantially anhydrous conditions.

5. A method of polymerizing an alkenyl alpha chloroacrylate while minimizing color formation during the polymerization which comprises conducting the polymerization under substantially anhydrous conditions.

6. A method of polymerizing allyl alpha chloroacrylate while minimizing color formation during the polymerization which comprises conducting the polymerization under substantially anhydrous conditions.

7. A method of polymerizing ethyl alpha chloroacrylate while minimizing color formation during the polymerization which comprises conducting the polymerization under substantially anhydrous conditions.

8. A method of forming a polymerized alpha chloroacrylate while minimizing color formation during polymerization which comprises separating water hydrolysis products of the chloroacrylate from the monomeric chloroacrylate and polymerizing the monomer under substantially anhydrous conditions.

9. A method of forming a polymerized ester of alpha chloroacrylic acid while minimizing color formation during polymerization which comprises separating water hydrolysis products of the chloroacrylate from the monomeric chloroacrylate and polymerizing the monomer under substantially anhydrous conditions.

10. A method of forming a polymerized methyl ester of alpha chloroacrylic acid while minimizing color formation during polymerization which comprises separating water hydrolysis products of the chloroacrylate from the monomeric chloroacrylate and polymerizing the monomer under substantially anhydrous conditions.

11. A method of forming a polymerized chloroacrylate while minimizing color formation during polymerization which comprises distilling a monomeric chloroacrylate to separate water hydrolysis products of the chloroacrylate from the monomeric chloroacrylate and polymerizing the monomer under substantially anhydrous conditions.

12. A method of forming a polymerized ester of alpha chloroacrylic acid while minimizing color formation during polymerization which comprises distilling monomeric chloroacrylate to separate water hydrolysis products of the chloroacrylate from the monomeric chloroacrylate and polymerizing the monomer under substantially anhydrous conditions.

13. A method of forming a polymerized methyl ester of alpha chloroacrylate while minimizing color formation during polymerization which comprises distilling monomeric chloroacrylate to separate water hydrolysis products of the chloroacrylate from the monomeric chloroacrylate and polymerizing the monomer under substantially anhydrous conditions.

FRANKLIN STRAIN.
MAXWELL A. POLLACK.